(12) United States Patent
Cucala García

(10) Patent No.: US 9,313,736 B2
(45) Date of Patent: Apr. 12, 2016

(54) METHOD, SYSTEM AND DEVICES FOR IMPROVING DISCONTINOUS RECEPTION IN WIRELESS COMMUNICATION NETWORKS

(71) Applicant: Luis Cucala García, Madrid (ES)

(72) Inventor: Luis Cucala García, Madrid (ES)

(73) Assignee: Telefonica, S.A., Madrid (ES)

( * ) Notice: Subject to any disclaimer, the term of this patent is extended or adjusted under 35 U.S.C. 154(b) by 34 days.

(21) Appl. No.: 14/509,260

(22) Filed: Oct. 8, 2014

(65) Prior Publication Data

US 2015/0098381 A1    Apr. 9, 2015

(30) Foreign Application Priority Data

Oct. 8, 2013  (EP) .................................... 13382395

(51) Int. Cl.
| | |
|---|---|
| *G08C 17/00* | (2006.01) |
| *H04W 52/02* | (2009.01) |
| *H04W 76/04* | (2009.01) |
| *H04W 56/00* | (2009.01) |

(52) U.S. Cl.
CPC .......... *H04W 52/0216* (2013.01); *H04W 52/02* (2013.01); *H04W 56/00* (2013.01); *H04W 76/048* (2013.01)

(58) Field of Classification Search
None
See application file for complete search history.

(56) References Cited

U.S. PATENT DOCUMENTS

| | | | | |
|---|---|---|---|---|
| 2010/0118815 | A1* | 5/2010 | Kim ................... | H04W 52/0216 370/329 |
| 2010/0330992 | A1* | 12/2010 | Bhattacharjee ..... | H04W 52/028 455/436 |
| 2012/0033595 | A1* | 2/2012 | Aoyama ............. | H04W 76/048 370/311 |
| 2012/0051274 | A1* | 3/2012 | Song ..................... | H04W 48/10 370/311 |
| 2012/0300685 | A1* | 11/2012 | Kim ..................... | H04W 76/048 370/311 |
| 2013/0044659 | A1 | 2/2013 | Jokimies et al. | |
| 2013/0170415 | A1* | 7/2013 | Fukuta ............. | H04W 52/0216 370/311 |
| 2013/0301501 | A1* | 11/2013 | Olvera-Hernandez | H04W 76/048 370/311 |
| 2015/0282083 | A1* | 10/2015 | Jeong ................ | H04W 52/0216 370/311 |

FOREIGN PATENT DOCUMENTS

WO    WO 2012/141630    10/2012

OTHER PUBLICATIONS

European Search Report issued in corresponding European Application No. 13382395.5 dated Apr. 16, 2014.
Huawei (Rapporteur), "Summary of email discussion [82#13] [Joint/MTCe] Evaluation of extended DRX cycles for UEPCOP", 3GPP, vol. RAN WG2, pp. 1-23, Aug. 19-23, 2013, Barcelona, Spain.

* cited by examiner

*Primary Examiner* — Bob Phunkulh
(74) *Attorney, Agent, or Firm* — Ostrolenk Faber LLP

(57) ABSTRACT

A method, system and devices for optimizing the discontinuous reception by a mobile terminal of signals transmitted from its serving base extension so battery and other user equipment resources can be saved by using an extended DRX period several orders of magnitude longer with respect to what is achievable in the current standard, without the terminal losing synchronization.

15 Claims, 4 Drawing Sheets

METHOD, SYSTEM AND DEVICES FOR IMPROVING DISCONTINOUS RECEPTION IN WIRELESS COMMUNICATION NETWORKS

TECHNICAL FIELD OF THE INVENTION

The present invention relates to a method, system and devices for improving discontinuous reception in wireless communication networks and more particularly, to a method, system and devices that allow a user equipment in a wireless communication network to optimize the discontinuous reception of signals from its serving base extension so battery and other user equipment resources can be saved.

BACKGROUND OF THE INVENTION

Long-Term Evolution (LTE) is the next step in 3rd Generation (3G) cellular networks, which represents basically an evolution of the current mobile communications standards. LTE is considered by many to be a Fourth Generation (4G) technology, both because it is faster than 3G, and because, like the Internet, LTE uses a flat "all-IP" architecture where all information, including voice, is handled as data. LTE provides throughputs up to 50 Mbps in uplink and up to 100 Mbps in downlink, uses scalable bandwidth from 1.25 to 20 MHz in order to suit the needs of network operators that have different bandwidth allocations and is also expected to improve spectral efficiency in networks, allowing carriers to provide more data and voice services over a given bandwidth.

LTE physical layer frame structure is described in the standard 3GPP TS 36.211 "3rd Generation Partnership Project; Technical Specification Group Radio Access Network; Evolved Universal Terrestrial Radio Access (E-UTRA); Physical Channels and Modulation" for both FDD mode and TDD mode duplexing procedures. The frame is 10 milliseconds long and is divided in 10 subframes, and every subframe is divided in two slots. The LTE frame transports a set of physical channels and physical signals (also described in said standard). Among these physical signals are the Primary Synchronization Signal (PSS) and the Secondary Synchronization Signal (SSS), which are used by an LTE User Equipment, UE, to synchronize with the base station (called in LTE evolved or enhanced Node B, eNB) frame and to derive the identity of the cell. Both PSS and SSS are transmitted twice per frame, in the symbols #5 and #6 of slot #0, and in the symbols #5 and #6 of slot #10.

Every slot is divided in 6 or 7 OFDM (Orthogonal Frequency Division Multiplexing) symbols, and every OFDM symbol consists of an initial cyclic prefix and a data part. The cyclic prefix is used to avoid inter-symbol interference in the presence of multi-path propagation. The length of the cyclic prefix of the first symbol of every slot is different to the length of the cyclic prefix of the remaining six symbols, and is equal to $160\times(0.5\times10^{-2}/153600)=5.2$ us in the case of the normal cyclic prefix, and equal to $512\times(0.5\times10^{-2}/153600)=16.7$ us in the case of the extended cyclic prefix.

The PSS is constructed from a sequence of length 63, with the middle element punctured to avoid transmitting on the direct current subcarrier. Three PSS sequences are used in LTE, corresponding to three possible cell identities. The user equipment, UE, (also called mobile terminal) must detect the PSS without any a priori knowledge of the channel, so a non-coherent demodulation must be done. The PSS is used by the UE to determine the timing and the frequency of the LTE signal, and to determine the cell identity. The SSS is constructed from maximum length sequences, and there are 168 possible sequences, corresponding to 168 possible cell identity-groups. Every sequence can be based on any of two codes, which are alternated between the first and second SSS transmissions in each radio frame. This enables the UE to determine the 10 ms radio frame start from a single observation of an SSS.

In OFDM, the controllable radio resource has three aspects: frequency, time and space. A Resource Block (RB) is the basic time-frequency resource allocable for data transmission. Both the PSS and the SSS make use of the six central Resource Blocks (RB) of the LTE radio frame. This six central RB's comprise 72 subcarriers, but the PSS and the SSS only make use of the central 62 subcarriers, in order to demodulate the PSS and the SSS by means of a 64-long FFT (Fast Fourier Transform).

When there is a need to deliver downlink data to a UE in idle mode, the LTE network sends a paging message to all the eNB's in its current Tracking Area (TA), and the eNB's page the UE over the radio interface. On receipt of a paging message, the UE performs a service request procedure which results in moving the UE to the connected state. Paging messages are transported in the Physical Downlink Shared Channel (PDSCH). The Physical Downlink Control Channel (PDCCH) signals a paging indicator, with the detailed paging information being carried on the PDSCH in the Resource Blocks indicated by the PDCCH. Paging indicators on the PDCCH use a single fixed identifier called the Paging Radio Network Temporary Identifier (P-RNTI). Rather than providing different paging identifiers for different groups of UE's, different UE's monitor different subframes for their paging messages.

Another use of the PDSCH is for broadcasting system information blocks (SIB's), which carry System Information (SI) that is not carried on the Physical Broadcast Channel (PBCH). The RB's used for broadcast data in the PDSCH are indicated by signalling messages on the PDCCH in the same way as for other PDSCH data, except that the identity indicated on the PDCCH is not the identity of a specific UE but a designated broadcast identity known as the System Information Radio Network Temporary Identifier (SI-RNTI), which is known a priori to all UE's. SI normally changes only at specific radio frames whose System Frame Number (SFN) is given by SFN mod N=0, where N is configurable and defines the period between two radio frames at which a change may occur, known as the modification period. Prior to performing a change of the system information, the Radio Access Network (called in LTE Enhanced or Evolved UMTS Radio Access Network, E-UTRAN) notifies the UE's by means of a Paging message including a SystemInfoModification flag. The LTE mechanism for indicating to a UE in idle mode that SI has changed is sending a paging message including the SystemInfoModification flag indicating whether or not SI has changed.

In order to receive paging messages from the LTE network, UE's in idle mode monitor the PDCCH for a P-RNTI or a SI-RNTI value used to indicate paging. The UE only needs to monitor the PDCCH channel at certain UE-specific subframes within specific radio frames. At other times, the UE may apply Discontinuous Reception (DRX), meaning that it can switch off its receiver to save battery energy. DRX functionality can be configured for an idle mode UE so that it does not always need to monitor the downlink channels. A DRX cycle consists of an On Duration during which the UE should monitor the PDCCH and a period during which a UE can skip reception of downlink channels.

The E-UTRAN configures which of the radio frames and subframes are used for paging. Each cell broadcasts a default paging cycle. In addition, upper layers may use dedicated signalling to configure a UE-specific paging cycle. If both are configured, the UE applies the lowest value. The UE calculates the radio frame (the Paging Frame (PF)) and the sub-frame within that PF (the Paging Occasion (PO)), which E-UTRAN uses to page the UE, by means of a procedure which takes into account the UE International Mobile Subscriber Identity (IMSI) and a T parameter, which is determined by the shortest of the UE-specific DRX cycle, if allocated by upper layers, and a default DRX cycle broadcast in system information. If UE specific DRX is not configured by upper layers, the default value is applied (the exact procedure is described in 3GPP TS 36.304 "3rd Generation Partnership Project; Technical Specification Group Radio Access Network; Evolved Universal Terrestrial Radio Access (E-UTRA); User Equipment (UE) procedures in idle mode").

The maximum length of the paging cycle, when the UE can receive a paging indication in a Paging Frame, is equal to 256 frames (that is, 2.56 seconds), which means that the maximum DRX period when the UE can remain switched off (without "listening" the signals from the base station) is 2.56 seconds. During the period when the radiofrequency section of the UE remains switched off, the local oscillator and the timing functions of the UE must remain operative, in order to keep the timing and to know when the DRX period has elapsed and it is necessary to completely switch on the UE for receiving paging messages. The maximum time the UE can remain switched off without resynchronizing its oscillator to the eNB frame depends on the characteristics of the frame and the frequency accuracy of the oscillator.

As stated before the LTE frame is 10 ms long, it is composed of 20 slots of 0.5 ms, each slot with 6 or 7 OFDM symbols, and the first symbol of every slot is preceded by a cyclic prefix that is between 5.2 us and 16.7 us long. Therefore, the maximum acceptable timing error for the UE oscillator after a DRX period is 5.2 us, because if the time error were longer than the cyclic prefix there would be inter-symbol interference when decoding the first symbol. A timing error of 5.2 us in a DRX period of 2.56 s is equivalent to a time error of 2 parts per million (ppm). This means that the UE oscillator frequency has drifted 2 ppm in 2.56 s.

The oscillator in the UE is usually a digitally controlled Voltage Controlled Crystal Oscillator (VCXO), and its frequency drift with time depends on a number of factors, and the most important of them in a time scale of seconds or minutes is a change in its temperature. According to several researches performed in the prior art, to provide an indication of the expected frequency change of a crystal oscillator due to a change of temperature depending on the type of crystal cut and the angle of the cut, the frequency change for a 10° C. variation around the specified temperature of operation, typically 25° C., is below 10 ppm. This means that a simple VCXO installed in a UE should suffer temperature variations of the order of some degrees Celsius in time scales of seconds (which is unlikely) to experience a frequency drift of the order of some parts per million. Hence, in normal operation conditions, when the device temperature will be stable, the VCXO in the UE will keep a frequency accuracy better than 2 ppm for time periods even much longer than 2.56 seconds (in other words, in normal conditions the UE can be switched off without resynchronizing its oscillator to the eNB much more than 2.56 seconds. On the other hand, the maximum time the UE can remain unsynchronized from the LTE frame depends greatly of the type of crystal oscillator in the UE, its current temperature and other UE implementation factors, and therefore only the UE can estimate that time.

The LTE network can request a UE to provide its capabilities using the "UE capability transfer" procedure (as described in 3GPP TS 36.331 "3rd Generation Partnership Project; Technical Specification Group Radio Access Network; Evolved Universal Terrestrial Radio Access (E-UTRA); Radio Resource Control (RRC); Protocol specification" version 11.2.0). The E-UTRAN can indicate for each Radio Access Technology (RAT), for example LTE, whether it wants to receive the associated UE capabilities. The UE provides the requested capabilities using a separate container for each RAT. If the UE-CapabilityRequest message from the LTE network to the UE includes the E-UTRA indicator, the UE will include the UE-EUTRA-Capability Information Element (IE) within a UE-CapabilityRAT-Container and with the RAT-Type set to EUTRA. The encoding of the UE capabilities in the UE-EUTRA-Capability IE, includes among other data the "UE-Category" can range from 1 to 8. Document 3GPP TS 36.306 "3rd Generation Partnership Project; Technical Specification Group Radio Access Network; Evolved Universal Terrestrial Radio Access (E-UTRA); User Equipment (UE) radio access capabilities". Section 4.1 UE-Category, describes the radio access capability parameters of the UE, including the UE-category and the parameters that are not dependent of the UE-category, which can be transmitted from the UE to the LTE network by means of a UE-EUTRA-Capability IE.

However, the information about UE capabilities reported by the UE to the LTE network does not include said estimation of the maximum time the UE can remain unsynchronized from the LTE frame. Actually, the LTE standard does not implement any method for reporting the maximum time a mobile terminal can remain unsynchronized from the LTE frame but being its local oscillator still time aligned with the LTE frame within a given time accuracy. Therefore, if the LTE network implemented discontinuous reception periods much longer than 2.56 seconds, some of the terminals would lose the time alignment and would require a complete resynchronization with the LTE frame, decoding the synchronization signals and probably losing the expected paging messages.

Some Machine Type Communications usage scenarios supported by wireless networks require the operation of the wireless terminal under very low power conditions, in order to enable a battery-powered wireless terminal to work for months or years without replacing its battery. The standard solution in the Wireless Sensors Network technical field is to implement very low working cycles, meaning that the terminal is most of the time switched off and switches on for very short time periods. So in these scenarios where a battery-powered mobile terminal should work for months or years without replacing its battery, discontinuous reception periods much longer than 2.56 seconds are required (of the order of minutes or even hours), current LTE wireless standard cannot therefore be used, as the maximum time for discontinuous operation in current LTE wireless networks is 2.56 seconds.

Hence, it is necessary to extend the time the mobile terminal can be switched off (especially in Machine Type Communications usage scenarios) by implementing mechanisms which allow to report the maximum time each terminal can remain unsynchronized from the LTE frame without losing time alignment in order to allow to extent the discontinuous reception periods and to minimize the time the terminal is on for receiving paging information from the LTE network. None of these mechanisms are implemented in the current LTE standard.

The proposed embodiments of the invention stated below will provide said mechanisms, overcoming at least some of the drawbacks of the prior art solutions.

SUMMARY OF THE INVENTION

The problems found in prior art techniques are generally solved or circumvented, and technical advantages are generally achieved, by the disclosed embodiments which provide a method system and device for improving discontinuous reception in wireless communication networks.

The present invention optimizes the discontinuous reception of signals from its serving base extension so battery and other user equipment resources can be saved by using an extended DRX period several orders of magnitude longer with respect to what is achievable in the current standard. In a further embodiment, the mobile terminal can receive paging messages from the eNB without any increase in the its energy consumption.

In a first aspect a method for discontinuous reception by a mobile terminal of wireless signals transmitted from its serving base station in a wireless communications network, said method being characterized by comprising the following steps:

the mobile terminal sending to its serving base station an estimation of the maximum time it can remain without synchronizing its local clock to the signal's frame of said base station and still being time aligned with said frame with a timing error less than a certain threshold, where said threshold is a design parameter
  the mobile terminal receiving from said base station an extended discontinuous reception period, where said period is calculated based on said maximum time estimation received from the mobile terminal
  the mobile terminal switching off certain of its sections during the extended discontinuous reception period, keeping operative its local clock and timing functions that allow said terminal to remain time aligned with the signal's frame of said base station.

In an embodiment the method further comprises the following steps:

The base station sending to the mobile terminal in a time period of a frame, frame synchronization information and, if there is paging information or system information updates for any terminal that has been assigned an Extended Discontinuous Reception Cycle, the base station sending a flag, in the same frame and in the same time period using some of the radio resources of said time period not used for synchronization information
  The mobile terminal, when the discontinuous reception period has finished, switching on said certain switched off sections, receiving said frame from the base station and decoding in the time period carrying the frame synchronization information, the radio resources used for sending the synchronization information and the radio resources used by the base station to send said flag
  If the mobile terminal decodes said flag, the mobile terminal will switch on said certain sections in the next frame or frames, in the expected dedicated time periods for transmitting paging information or system information updates to said terminal,
  If not, the terminal switching off again said certain sections, said sections remaining switched off for another Extended DRX period.

The wireless communications network may be a LTE mobile communications network, said mobile terminal may be an LTE User Equipment, said base station may be an evolved node B and the frame synchronization information may be sent using an LTE Primary Synchronization Signal, PSS, or an LTE Secondary Synchronization Signal, SSS or boths.

Said frame synchronization information may be used by the mobile terminal to perform a mandatory re-synchronization of its local clock and its frame timing. Paging indicators may be transmitted using a Physical Downlink Control Channels, PDCCH, and the System Information updates may be transmitted using a Physical Downlink Shared Channels, PDSCH.

In an embodiment, if the flag is detected, the time period when the UE will switch on the certain switched off sections will be in the expected slots and symbols where PDCCH will transport its paging indicator or where PDSCH will transport System Information updates.

The flag may be unique for all the mobile terminals serviced by the same base station.

In an embodiment, the certain sections switched off are the radiofrequency section and the baseband processing section of the mobile terminal.

In an embodiment, previous to the first step of the method, the mobile terminal receives from said base station a discontinuous reception period, where said period is shorter than the extended discontinuous reception period and the mobile terminal switches off said certain sections during the extended discontinuous reception cycle period, keeping operative its local clock and timing functions that allow said terminal to remain time aligned with the signal's frame of said base station.

In an embodiment, the base station sends said flag using any or all of the ten subcarriers that are not used in the central six Resource Blocks that support the transmission of the PSS or the SSS signals, the PSS and SSS signals being transmitted using 62 subcarriers out of the 72 subcarriers of the central six Resource Blocks.

In an embodiment, when the extended discontinuous reception period has finished, in order to obtain the synchronization information, the mobile terminal decodes all the 72 subcarriers of the central six Resource Blocks that support the transmission of the PSS and SSS, including the 62 subcarriers used for transmitting the synchronization information of the PSS or the SSS and the 10 subcarriers used to transmit the flag, In an embodiment, the frame in which the mobile terminal decodes the synchronization information is the first frame after switching the certain sections on once the DRX period is finished.

In an embodiment, the frame in which the mobile terminal decodes the synchronization information is the frame previous to the one where paging information or radio system information updates can be received.

According to another aspect of the invention, it is provided a mobile terminal for discontinuous reception of wireless signals transmitted from its serving base station in a wireless communications network, said mobile terminal being characterized by comprising:

processing means for obtaining an estimation of the maximum time it can remain without synchronizing its local clock to the frames received from said base station and still being time aligned with said frames with a timing error less than a certain threshold, where said threshold is a design parameter
  transmission means for sending to its serving base station said estimation
  reception means for receiving from said base station an extended discontinuous reception period, where said period is calculated based on said maximum time estimation received from the mobile terminal
  means for switching off certain sections of the mobile terminal during the extended discontinuous reception period, keeping operative its local clock and timing functions that allow said terminal to remain time aligned with the frames of said base station.

In an embodiment, the mobile terminal further comprises:
Means for switching on said certain switched off sections after the discontinuous reception period has finished
Reception means for receiving from its serving base station, in a time period of a frame, frame synchronization information and a flag
Means for decoding in the time period carrying the frame synchronization information, the radio resources used for sending the synchronization information and the radio resources used by the base station to send said flag
Means for, if the mobile terminal decodes said flag, switching on said certain sections in the next frame or frames, in the expected dedicated time periods for transmitting paging information or system information updates to said terminal and for, if not, switching off again said certain sections, which remain switched off for another Extended DRX period.

According to another aspect of the invention, it is provided a base station for discontinuous reception by a mobile terminal of wireless signals transmitted from said base station in a wireless communications network, said base station being characterized by comprising:
Reception means for receiving, from the mobile terminal, an estimation of the maximum time the mobile terminal can remain without synchronizing its local clock to the signal's frames of said base station and still being time aligned with said frames with a timing error less than a certain threshold, where said threshold is a design parameter
Transmission means for sending to the mobile terminal an extended discontinuous reception period, where said period is calculated based on said maximum time estimation received from the mobile terminal In an embodiment, said base station further comprises:
Transmission means for sending to the mobile terminal in a time period of a frame, frame synchronization information and, if there is paging information or system information updates for any terminal that has been assigned an Extended Discontinuous Reception Cycle, for sending a flag, in the same frame and in the same time period using some of the radio resources of said time period not used for synchronization information.

According to another aspect of the invention, it is provided a system for discontinuous reception by a mobile terminal of wireless signals transmitted from its serving base station in a wireless communications network, said system characterized by comprising:
a mobile terminal comprising:
processing means for obtaining an estimation of the maximum time it can remain without synchronizing its local clock to the signal's frame of said base station and still being time aligned with said frame with a timing error less than a certain threshold, where said threshold is a design parameter
transmission means for sending to its serving base station said estimation
reception means for receiving from said base station an extended discontinuous reception period
means for switching off certain sections during the duration of the extended discontinuous reception period, keeping operative its local clock and timing functions that allow said terminal to remain time aligned with the signal's frame of said base station and a base station comprising:
Reception means for receiving, from the mobile terminal, said estimation
Transmission means for sending to the mobile terminal the extended discontinuous reception period, where said period is calculated based on said maximum time estimation received from the mobile terminal In an embodiment, the base station of the system further comprises:
Transmission means for sending to the mobile terminal in a time period of a frame, frame synchronization information and, if there is paging information or system information updates for any terminal that has been assigned an Extended Discontinuous Reception Cycle, for sending a flag, in the same frame and in the same time period using some of the radio resources of said time period not used for synchronization information.
And the mobile terminal further comprises:
Means for switching on said certain switched off sections when the discontinuous reception period has finished
Reception means for receiving from its base station, in a time period of a frame, the frame synchronization information and the flag
Means for decoding in the time period carrying the frame synchronization information, the radio resources used for sending the synchronization information and the radio resources used by the base station to send said flag
Means for, if the terminal decodes said flag, switching on said certain sections in the next frame or frames, in the expected dedicated time periods for transmitting paging information or system information updates to said terminal and for, if not, switching off again said certain sections and remain switched off for another Extended DRX period.

According to another aspect of the invention, a computer program product is provided, comprising computer-executable instructions for performing any of the method previously disclosed, when the program is run on a computer and a digital data storage medium is also provided encoding a machine-executable program of instructions to perform any of the methods disclosed.

Consequently, according to the invention, a method, system, devices and computer program according to the independent claims are provided. Favourable embodiments are defined in the dependent claims.

These and other aspects of the invention will be apparent from and elucidated with reference to the embodiments described hereinafter.

DESCRIPTION OF THE DRAWINGS

To complete the description that is being made and with the object of assisting in a better understanding of the characteristics of the invention, in accordance with a preferred example of practical embodiments thereof, accompanying said description as an integral part thereof, is a set of drawings wherein, by way of illustration and not restrictively, the following has been represented.

DETAILED DESCRIPTION OF THE INVENTION

Figure 1:
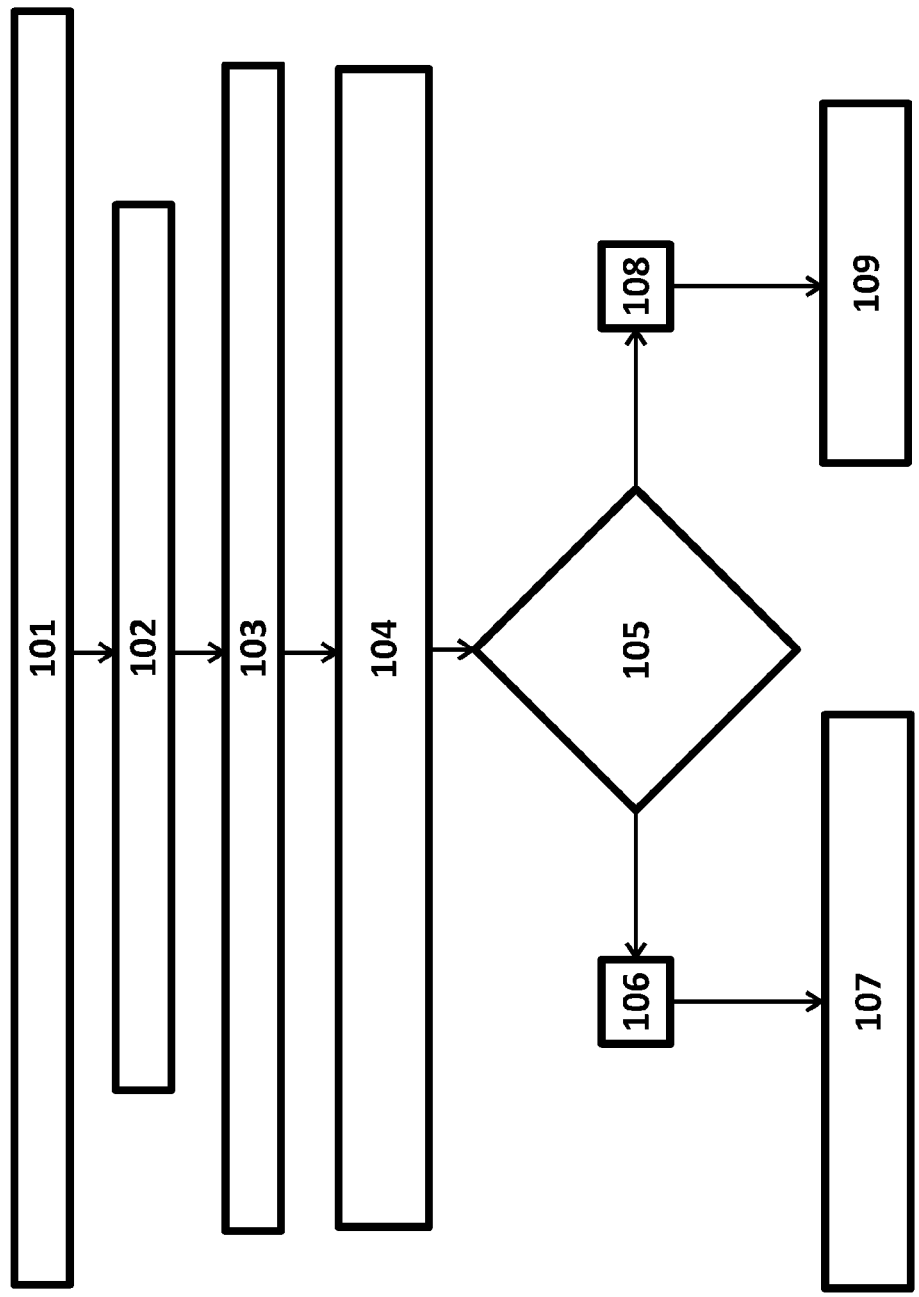
FIG. 1: It shows a flow chart of the Extended DRX procedure, according to an embodiment of the invention.

The present invention may be embodied in other specific devices, system and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The present invention allows a mobile terminal (a user equipment) to discontinuously receive wireless signals from its serving base station. In this specification the terms "user equipment" and "mobile terminal" are going to be used indistinctively having the same meaning and referring to the same element.

Said serving base station transmits synchronization information and paging information to the mobile terminal in dedicated time periods of downlink frames.

In an embodiment of the invention, the terminal reports to its serving base station an estimation of the maximum time it can remain without synchronizing its local clock to the signal's frame of said base station and still being time aligned with said frame within a given precision (that is, with a timing error less than a given threshold). The base station calculates an Extended Discontinuous Reception (Extended DRX) cycle based on said maximum time estimation reported by the mobile and send it back to the mobile terminal. Said Extended Discontinuous Reception cycle information sent to the mobile terminal indicates the duration of the period during which the mobile terminal can switch off some of its sections and skip the reception of the downlink channels (indicated as "Extended DRX period" in the figures).

After the mobile terminal receiving said Extended Discontinuous Reception information, the terminal switches off some of its working sections during the Extended DRX period, keeping operative its local clock and timing functions that allow said terminal to remain time aligned with the signal's frame of said base station. In an embodiment the switched off sections are the radiofrequency section and baseband processing section (the section managing all the radio functions) but other sections can be also switched off.

Previous to receiving the Extended Discontinuous Reception Period, the mobile terminal may have received from said base station an standard Discontinuous Reception Period (of course, much shorter than the Extended Discontinuous Reception Period) and the mobile terminal switches off some of the sections (e.g. the radiofrequency and the baseband processing sections) during said shorter discontinuous reception period, keeping operative its local clock and timing functions that allow said terminal to remain time aligned with the signal's frame of said base station. After receiving the Extended Discontinuous Reception Period the mobile terminal disregards the previous standard DRX period and uses this longer period for the Discontinuous Reception.

In an embodiment, in order to send paging information and radio system information updates without increasing the time said terminal is switched on, said base station can send a flag in the same time period (e.g. in the same time slot) of the frame which is used by the terminal to synchronize with said base station signal's frame, making use of the radio resources of said synchronization time period that are not used for synchronization purposes. Said flag indicates that there is paging information or radio system information updates in some of the dedicated time periods for transmitting said information in the next frame or frames, for any terminal that has been assigned an Extended DRX cycle (that is, the terminals which have sent the estimation of the maximum time they can be without synchronization and have received and Extended DRX, longer than the standard period). Said flag may be unique in a given base station and known in advance by said UE for simplifying its decoding by the terminals. That is, the way of coding said flag in the frame may be unique in a given base station and be known by the UE (for example because it has been communicated to the UE in the broadcast channels or because it has been previously specified in a communications standard).

The flag may be a sequence of bits with a certain predefined value and it may be an on/off indication. When said flag is correctly decoded (e.g. the sequence of bits is decoded and has a certain value), it is considered as an "on" indication (in this case, it will indicate that there is paging information or radio system information updates in some of the dedicated time periods for transmitting said information in the next frame or frames) and when said flag is not correctly decoded it is considered as an "off" indication (in this case, that there is no paging information or radio system information updates in the next frame or frames). The flag may also be a field including more information.

That is, the synchronization information and the flag are sent in the same time period (for example, in the same time slot or even in the same OFDM symbol), using different radio resources in the same time period.

After the Extended DRX period, and in the frame previous to the one where paging information or radio system information updates can be received, said terminal switches on its radiofrequency section and baseband processing section for decoding the dedicated time periods for transmitting synchronization information, in order to re-synchronize its local clock and its frame timing. Said terminal can simultaneously decode the radio resources not used for synchronizing and used by the base station to send said flag, therefore not increasing the time said UE is switched on for synchronization, and therefore without any increase in the terminal energy consumption with respect to what is necessary for synchronization.

Said terminal, in the case of decoding said flag, will switch on its radiofrequency section and baseband processing section in the next frame or frames, in the expected dedicated time periods for transmitting paging information or radio system information updates to said terminal. Said terminal, in the case of not decoding said flag will not switch on its radiofrequency section and baseband processing section in the next frame, and will remain switched off for another Extended DRX period.

In an embodiment, the mobile communication network is an LTE mobile communications network. In this case, the mobile terminal may be an LTE user equipment and the serving base station may be a LTE e-Node B (eNB). The radio resources used for transmitting synchronization information to the mobile terminal, in order to re-synchronize its local clock and its frame timing with the eNB frame may be the LTE Primary Synchronization Signal (PSS) and the LTE Secondary Synchronization Signal (SSS).

Although a preferred embodiment of the invention is related to LTE networks, the problem and solution embodiments described here are applicable to any wireless cellular technology. The invention may be utilized by any wireless technology that includes the possibility of discontinuous reception of user equipments.

The reporting of the estimation of the maximum time said mobile terminal can remain without synchronizing its local clock to the LTE frame of its serving eNB (and still being time aligned with said frame within a given precision) may be reported to the LTE network by means of a UE-EUTRA-Capability Information Element which includes a new "general parameter" for that purpose (for example, labeled "Extended DRX type"). The value of said parameter can be for example an integer which indicates the estimated time (e.g. in seconds, minutes, hours . . . ) in seconds or any other value from which the estimated time can be calculated. The UE-EUTRA-Capability IE is sent by means of the standard "UE capability transfer" procedure.

In order to calculate said maximum time without synchronizing its local clock to the LTE frame of its serving eNB and still being time aligned with said frame within a given precision, the mobile terminal can follow many different procedures known from the prior art.

Said calculation could take into account the characteristics of its local oscillator, temperature, voltage supply or LTE frame characteristics (for example normal cyclic prefix frame or an extended cyclic prefix frame) and in any case, the timing error of the allowed will have to be below the cyclic prefix length used in the frame. The specific process used by the mobile terminal to estimate said maximum time is not an object of this invention.

In one embodiment of this invention the E-UTRAN configures an UE-specific Extended DRX Cycle for the mobile terminal which has reported the "Extended DRX type" parameter, based on said maximum time estimation made by the mobile terminal. Upper layers may use dedicated signalling to configure a UE-specific Extended DRX cycle. If both the default paging cycle and the UE-specific Extended DRX Cycle are configured, the UE applies the highest value of them. As stated before, the UE calculates the radio frame (the Paging Frame (PF)) and the subframe within that PF (the Paging Occasion (PO)), which E-UTRAN uses to page the UE, by means of the procedure described in the correspondent 3GPP standard. However, in this case the parameter T, is determined by the longest of the UE-specific Extended DRX value, if allocated by upper layers, and a default DRX value broadcast in system information.

The serving base station may send a flag using radio resources not used for synchronization purposes in the same time period of the frame used by the mobile terminal for synchronization. For example, in case of using the LTE Primary Synchronization Signal (PSS) and the LTE Secondary Synchronization Signal (SSS) for synchronization, said flag can be send in the any or all of the ten subcarriers that are not used in the central six Resource Blocks (RB's) for transmitting the PSS or the SSS in the slot 0 of the LTE frame or in the slot 10 of the LTE frame (the slots where said PSS and SSS are transmitted). Said flag may be unique in a given cell for simplifying its decoding by said UE.

The coding and modulation of the flag in the ten subcarriers that are not used in the central six Resource Blocks (RB's) can be performed using different known prior art procedures. The specific procedure to coding and modulating the flag in the ten subcarriers that are not used in the central six Resource Blocks (RB's) for transmitting the PSS or the SSS is not an object of this invention of this invention. The flag coding may be based for example on the cell identity of the serving eNB's cell, as it is signaled in the PSS or it may be based on the cell identity-group of the serving eNB's cell, as it is signaled by the SSS or even in the combination of the cell identity and the cell identity-group. Any of these coding procedures allow the UE to know in advance the coding of the flag, and therefore reducing the time and energy required for its decoding.

In one embodiment, said flag indicates indistinctly paging information or radio system information updates in the next frames or frames for any UE that has been assigned an Extended DRX cycle so the UEs will have to listen to the correspondent channels (PDCCH for the paging indicators and PSCCH for the system information updates) in the next frame or frames to see if there is any information for them. In one embodiment, said flag indicates that there are paging indicators in some of the Physical Downlink Control Channels (PDCCH) in the next frame for any UE that has been assigned an Extended DRX cycle. In another embodiment, said flag indicates that there are system information blocks (SIB's) updates in the PDSCH in the next frames for any UE that has been assigned an Extended DRX cycle.

In said embodiments, the flag does not identify the UE to which the information is addressed, so any UE that has been assigned an Extended DRX cycle, in the case of decoding said flag will "listen to" the dedicated time periods in the next frame or frames to see if the information is for it (that is, it will switch on its radiofrequency section and baseband processing section in the next frame or frames, in the expected slots and symbols where PDCCH will transport its paging indicator or the PDSCH will transport SIB's updates). In case the information is not intended for it, the UE will switch off the radiofrequency and baseband processing sections, starting a new Extended DRX cycle.

After the Extended DRX period and in the frame previous to the one where paging indicators can be received in the PDDCH or SIB updates can be received in the PDSCH, said UE switches on its radiofrequency section and baseband processing section for decoding the PSS, or the SSS, or both, in order to re-synchronize its local clock and frame timing. Such resynchronization is mandatory; otherwise said UE will lose the timing of the LTE frame. In addition to read (decode) the synchronization information necessary for the resynchronization, the UE analyses the radio resources where said flag can be sent by the serving base station. In the embodiment disclosed above (where PSS and SSS are used for synchronization), the UE decodes all the 72 subcarriers of the central six RB's that support the PSS or the SSS and therefore decodes the 62 subcarriers used by the PSS or the SSS, and simultaneously the 10 subcarriers that can be used by the eNB to send said flag. Therefore, receiving and decoding said flag does not require that said UE switches on its radiofrequency and baseband section for a period longer than what is necessary for receiving and decoding the PSS or the SSS, and therefore said flag reception and decoding does not increase UE energy consumption with respect to what is necessary for synchronization purposes.

Said UE, in the case of decoding said flag in the PSS or the SSS, will switch on its radiofrequency section and baseband processing section in the next frame or frames, in the expected slots and symbols where PDCCH will transport its paging indicator or in the expected slots and symbols where the PDSCH will transport SIB updates. Said UE, in the case of not decoding said flag in the PSS or the SSS, will not switch on its radiofrequency section and baseband processing section in the next frame or frames, and will remain switched off for another Extended DRX period.

In FIG. 1, it is shown a flowchart of the different steps performed according to an embodiment of the invention, as explained in the above paragraphs.

In a first step (101) the UE reports to the LTE network (to a LTE network node) a message (e.g. a UE-EUTRA-Capability IE) including an "Extended DRX type" parameter with the estimating maximum time without synchronization value for said UE. Then (102), the LTE network reports to the UE a "UE-specific Extended DRX Cycle". And the UE is switched off (the radio frequency and base band sections) during the Extended DRX period (103).

After the Extended DRX period has ended, the UE switches on the radio frequency and base band sections to read the synchronization information (104) and detect the flag (105). If the flag is detected (106), the UE is switched on in the next frames where paging or SI update information can be received (107). If not (108), the mobile is witched off again (the radio frequency and base band sections) during another Extended DRX period (109).

Figure 2:
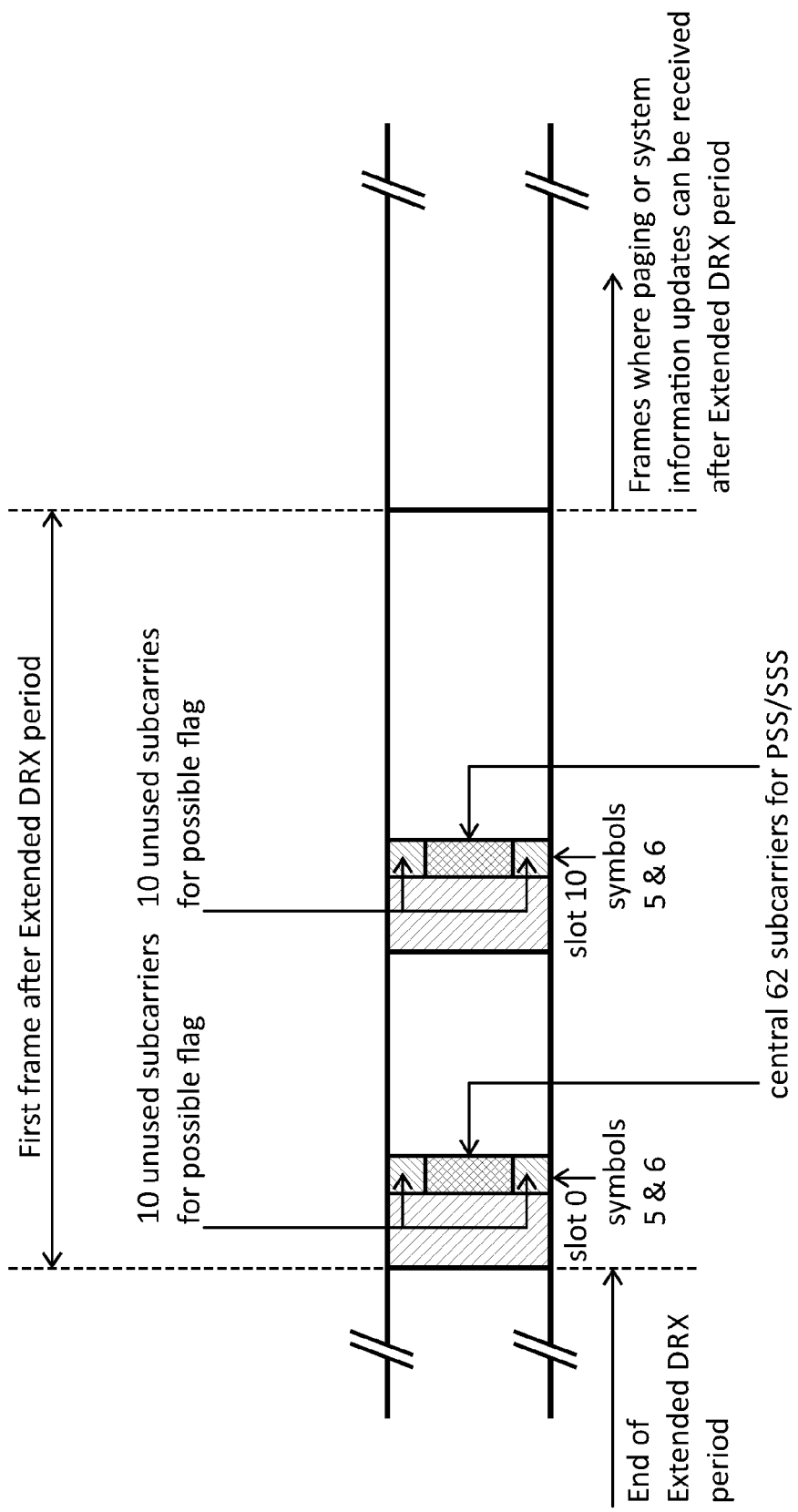
FIG. 2: It shows a schematic diagram of the first LTE frame after the Extended DRX period, according to an embodiment of the invention.

FIG. 2 shows a scheme of the LTE frame, the first frame after the Extended DRX period (that is, the first frame after the UE is switched on for synchronization) according to an embodiment of the invention. The slots 0 and 10 in said frame will carry the PSS and SSS signals. The central 62 subcarriers will be used for carrying said signals (and will be decoded by the UE for synchronization purposes) and the 10 unused subcarriers can be used for coding a flag, in slot 0 or slot 10. In case the serving base station wants to send a flag because there is paging information or SI information updates, the flag can be included in any of the slots or even in both of them (this will be a design option of the network operator).

Figure 3:
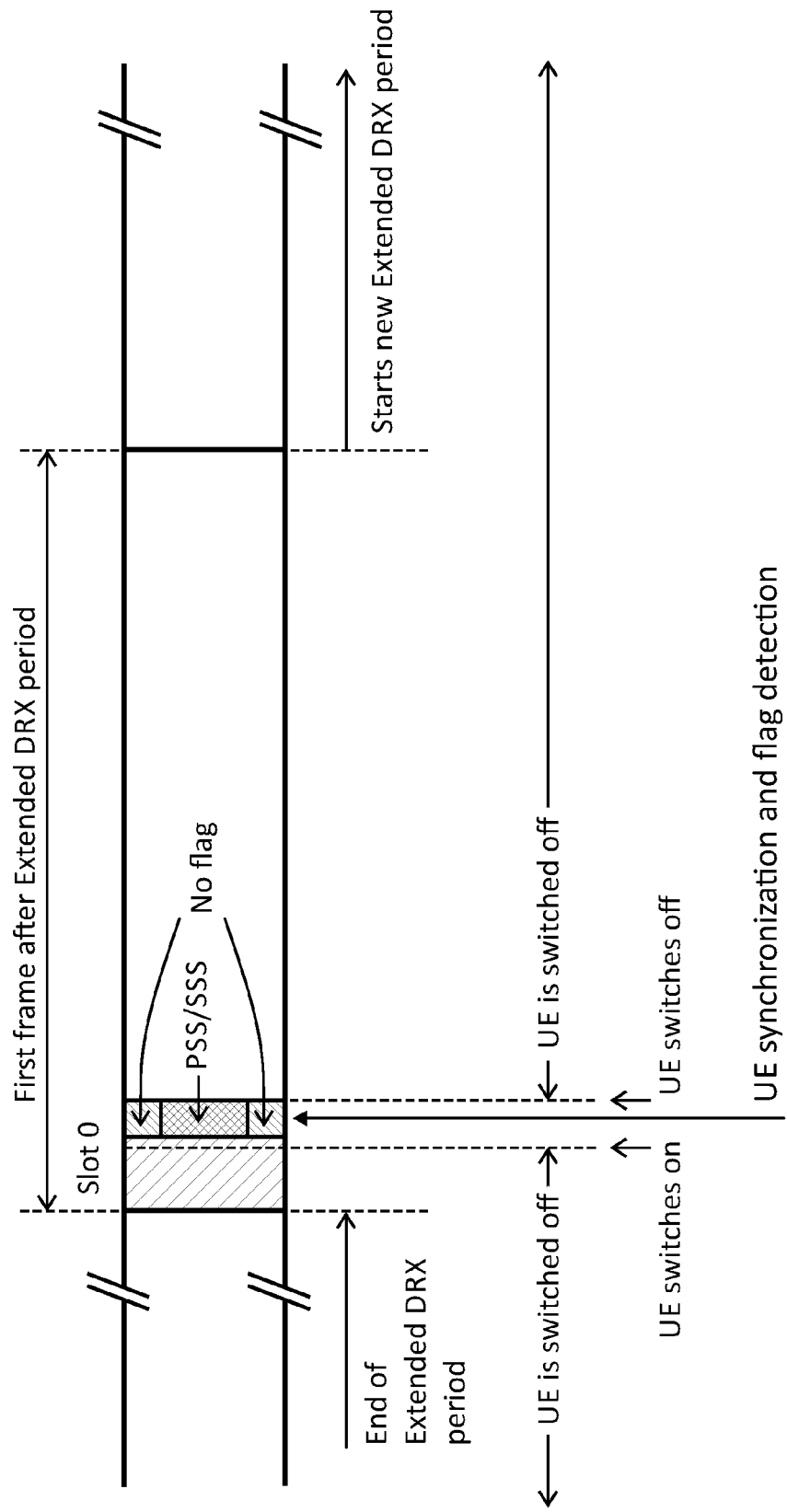
FIG. 3: It schematically shows the procedures for the case that no flag is transmitted according to an embodiment of the invention.

FIG. 3 shows a scheme of the procedures for the case that no flag is transmitted. After the end of the Extended DRX period, the UE switches on for decoding the PSS or the SSS or both. In the example depicted in the figure, the UE switches on for decoding the PSS/SSS in slot 0 and simultaneously decoding a possible flag, but the same procedures could be applied in the case of using slot 10 (in this case, the UE will be switched off after slot 10). The UE decodes the PSS or the SSS for resynchronizing its local oscillator with the LTE frame, and as it does not decode a flag, switches off again, starting a new Extended DRX period (e.g. from the next frame).

Figure 4:
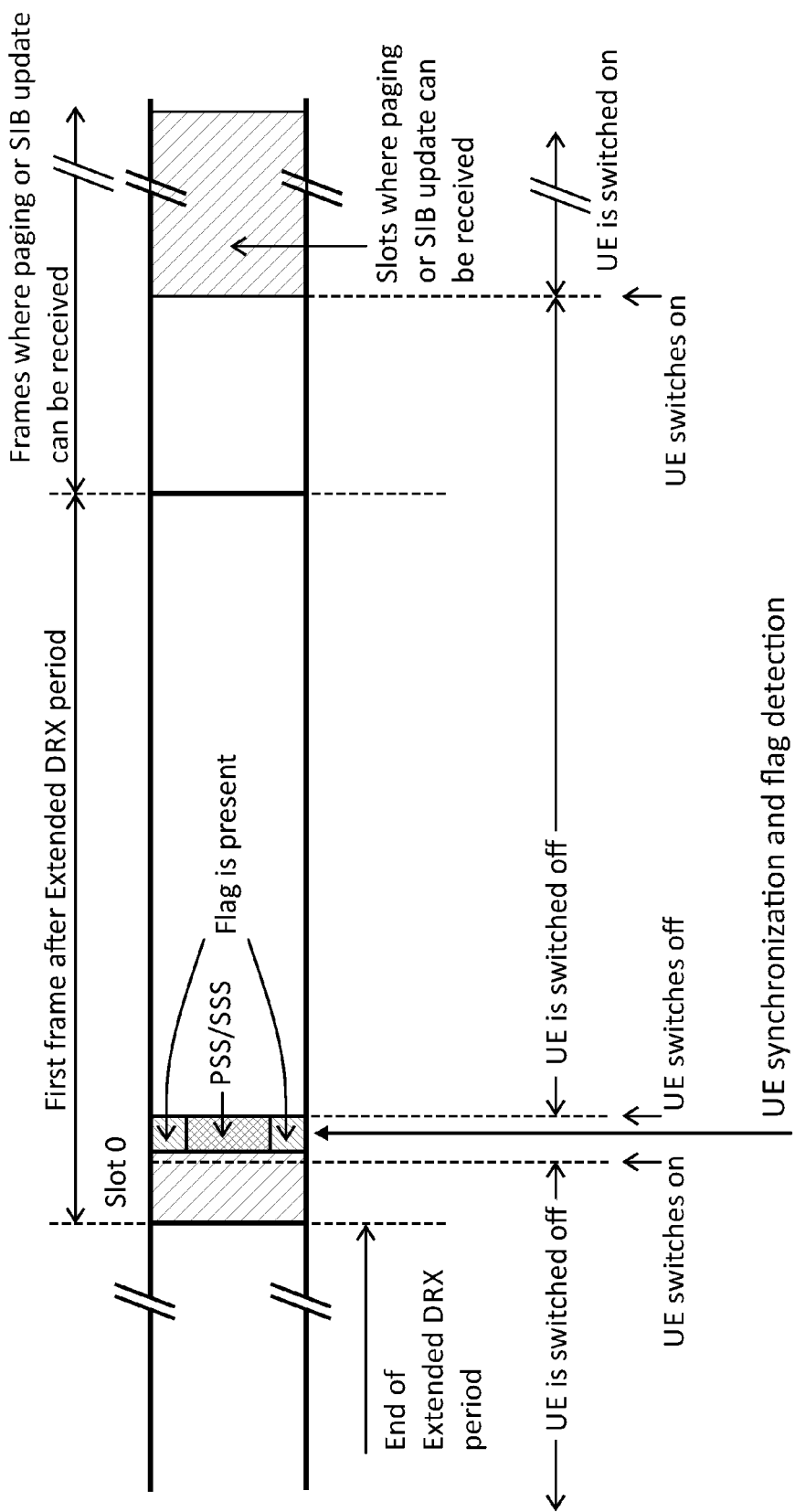
FIG. 4: It schematically shows the procedures for the case that a flag is transmitted according to an embodiment of the invention.

FIG. 4 shows a scheme of the procedures for the case that a flag is transmitted. After the end of the Extended DRX period, the UE switches on for decoding the PSS or the SSS or both. In the example depicted in the figure, the UE switches on for decoding the PSS/SSS in slot 0 and simultaneously decoding a possible flag, but the same procedures could be applied in the case of using slot 10. The UE decodes the PSS or the SSS for resynchronizing its local oscillator with the LTE frame, and it decodes also a flag. It switches off again until the expected slot or slots in the next frame or frames where paging information for said UE or system information update can be received, when it will switch on to receive that information. In an embodiment, it is enough that the flag is included in any of the slots. In an alternative embodiment, the same flag must be included in both slots and if not, the UE will consider that the flag is not valid and it will perform the switching off procedure as in the previous scenario.

Summarizing, discontinuous reception in a UE is fundamentally limited by its local oscillator, which must be re-synchronized periodically to overcome frequency drifts due to temperature and power supply changes. Standard low cost crystal oscillators can remain unsynchronized for a period longer than the current maximum DRX cycle of 2.56 seconds and still keep the LTE frame synchronization within a time error below the duration of the cyclic prefix of the first symbol of a slot. For applications where long paging delays are acceptable, like Machine Type Communications (MTC), battery lifetime maximization is achieved by means of very long switching off periods (DRX periods) at the receiver.

The current LTE standard enables a working cycle (a ratio of the switch on time duration with respect to the discontinuous reception cycle when the terminal is switched off) between $28.08 \cdot 10^{-6}$ (for a 2.56 s DRX cycle and a one-symbol PDDCH) and $11.23 \cdot 10^{-6}$ (for a 2.56 s DRX cycle and a four-symbol PDDCH). In the case of MTC, the higher value will be more common, because low cost MTC UE's can make use of a transmission bandwidth of 1.8 MHz or lower and therefore requiring from two to four symbols for transmitting the PDCCH.

The proposed invention enables a UE to report the maximum time it can remain switched off and still being time synchronized with the LTE frame, which can be several orders of magnitude longer than the current 2.56 seconds limit. Therefore the eNB can mandate an extended DRX cycle to that UE and the UE can reduce its working cycle several orders of magnitude with respect to what is achievable in the current standard, greatly decreasing its energy consumption.

Furthermore, this invention optionally enables to include a paging flag in the RB's used for transporting the slots where the synchronization information is included (e.g. the PSS or the SSS). Given the fact that, after the extended DRX cycle, the UE must necessarily switch on to decode the PSS in order to keep synchronized with the eNB frame, receiving the paging flag does not increase the time the UE is on, therefore it is possible to receive paging messages from the eNB without any increase in the UE energy consumption.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention.

Although the present invention has been described with reference to specific embodiments, it should be understood by those skilled in the art that the foregoing and various other changes, omissions and additions in the form and detail thereof may be made therein without departing from the scope of the invention as defined by the following claims.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for discontinuous reception by a mobile terminal of wireless signals transmitted from its serving base station in a wireless communications network, said method comprising the following steps:
   a) the mobile terminal sending to its serving base station an estimation of the maximum time it can remain without synchronizing its local clock to the signal's frame of said base station and still being time aligned with said frame with a timing error less than a certain threshold, where said threshold is a design parameter;
   b) the mobile terminal receiving from said base station an extended discontinuous reception period, where said period is calculated based on said maximum time estimation received from the mobile terminal; and
   c) the mobile terminal switching off certain of its sections during the extended discontinuous reception period, keeping operative its local clock and timing functions that allow said terminal to remain time aligned with the signal's frame of said base station.

2. A method according to claim L further comprising the following steps:
   d) the base station sending to the mobile terminal in a time period of a frame, frame synchronization information and, if there is paging information or system information updates for any terminal that has been assigned an Extended Discontinuous Reception Cycle, the base station sending a flag in the same frame and in the same time period using some of the radio resources of said time period not used for synchronization information;
   e) the mobile terminal, when the extended discontinuous reception period has finished, switching on said certain switched off sections, receiving said frame from the base station and decoding in the time period carrying the frame synchronization information, the radio resources used for sending the synchronization information and the radio resources used by the base station to send said flag;
   f) if the mobile terminal decodes said flag, the mobile terminal will switch on said certain sections in the next frame or frames, in the expected dedicated time periods for transmitting paging information or system information updates to said terminal; and
   g) if not, the mobile terminal switching off again said certain sections and keeping said certain sections switched off for another Extended DRX period.

3. A method according to claim 2, wherein said wireless communications network is a LTE mobile communications network, said mobile terminal is an LTE User Equipment, said base station is an evolved node B and the frame synchronization information is sent using an LTE Primary Synchronization Signal, PSS, and/or an LTE Secondary Synchronization Signal, SSS.

4. A method according to claim 3, wherein paging indicators are transmitted using a Physical Downlink Control Channel, PDCCH, and the System Information updates are transmitted using a Physical Downlink Shared Channels, PDSCH.

5. A method according to claim 3, wherein the base station sends said flag using any or all of the ten subcarriers that are not used in the central six Resource Blocks that support the transmission of the PSS and/or the SSS signals, the PSS and SSS signals being transmitted using 62 subcarriers out of the 72 subcarriers of the central six Resource Blocks.

6. A method according to claim 5, wherein in step e) when the extended discontinuous reception period has finished, in order to obtain the synchronization information to perform a mandatory resynchronization of its local clock and its frame timing, the mobile terminal decodes all the 72 subcarriers of the central six Resource Blocks, including the 62 subcarriers used for transmitting the synchronization information of the PSS and/or the SSS and the 10 subcarriers used for transmitting the flag.

7. A method according to claim 1, wherein the certain sections switched off are the radiofrequency section and the baseband processing section of the mobile terminal.

8. A method according to claim 1, wherein said wireless communications network is a LTE mobile communications network, said mobile terminal is an LTE User Equipment and said base station is an evolved node B.

9. A mobile terminal for discontinuous reception of wireless signals transmitted from its serving base station in a wireless communications network, said mobile terminal comprising:
   processing means for obtaining an estimation of the maximum time it can remain without synchronizing its local clock to the frames received from said base station and still being time aligned with said frames with a timing error less than a certain threshold, where said threshold is a design parameter;
   transmission means for sending to its serving base station said estimation;
   reception means for receiving from said base station an extended discontinuous reception period, where said period is calculated based on said maximum time estimation received from the mobile terminal; and
   means for switching off certain sections of the mobile terminal during the extended discontinuous reception period, keeping operative its local clock and timing functions that allow said terminal to remain time aligned with the frames of said base station.

10. A mobile terminal according to claim 9, further comprising:
   means for switching on said certain switched off sections after the discontinuous reception period has finished;
   reception means for receiving from its serving base station, in a time period of a frame, frame synchronization information and a flag;
   means for decoding in the time period carrying the frame synchronization information, the radio resources used for sending the synchronization information and the radio resources used by the base station to send said flag; and
   means for, if the terminal decodes said flag, switching on said certain sections in the next frame or frames, in the expected dedicated time periods for transmitting paging information or system information updates to said terminal and for, if not, switching off again said certain sections and keeping switched off said sections for another Extended DRX period.

11. A base station for discontinuous reception by a mobile terminal of wireless signals transmitted from said base station in a wireless communications network, said base station comprising:
   reception means for receiving, from the mobile terminal, an estimation of the maximum time the mobile terminal can remain without synchronizing its local clock to the signal's frames of said base station and still being time aligned with said frames with a timing error less than a certain threshold, where said threshold is a design parameter; and
   transmission means for sending to the mobile terminal an extended discontinuous reception period, where said period is calculated based on said maximum time estimation received from the mobile terminal, wherein the mobile terminal switching off certain of its section during the extended discontinuous reception period, keeping operative its local clock and timing function that allow said terminal to remain time aligned with the signal's frame of said base station.

12. A base station according to claim 11, further comprising:
transmission means for sending to the mobile terminal in a time period of a frame, frame synchronization information and, if there is paging information or system information updates for any terminal that has been assigned an Extended Discontinuous Reception Cycle, for sending a flag, in the same frame and in the same time period using some of the radio resources of said time period not used for synchronization information.

13. A system for discontinuous reception by a mobile terminal of wireless signals transmitted from its serving base station in a wireless communications network, said system comprising: a mobile terminal comprising:
processing means for obtaining an estimation of the maximum time it can remain without synchronizing its local dock to the signal's frame of said base station and still being time aligned with said frame with a timing error less than a certain threshold, where said threshold is a design parameter;
transmission means for sending to its serving base station said estimation;
reception means for receiving from said base station an extended discontinuous reception period;
means for switching off certain sections during the extended discontinuous reception period, keeping operative its local clock and timing functions that allow said terminal to remain time aligned with the signal's frame of said base station;
and a base station comprising:
reception means for receiving, from the mobile terminal, said estimation; and
transmission means for sending to the mobile terminal the extended discontinuous reception period, where said period is calculated based on said maximum time estimation received from the mobile terminal.

14. A system according to claim 13, wherein the base station further comprises:
transmission means for sending to the mobile terminal in a time period of a frame, frame synchronization information and, if there is paging information or system information updates for any terminal that has been assigned an Extended Discontinuous Reception Cycle, for sending a flag, in the same frame and in the same time period using some of the radio resources of said time period not used for synchronization information;
and wherein the mobile terminal further comprises:
means for switching on said certain switched off sections after the discontinuous reception period has finished;
reception means for receiving from its base station, in a time period of a frame, the frame synchronization information and the flag;
means for decoding in the time period carrying the frame synchronization information, the radio resources used for sending the synchronization information and the radio resources used by the base station to send said flag; and
means for, if the terminal decodes said flag, switching on said certain sections in the next frame or frames, in the expected dedicated time periods for transmitting paging information or system information updates to said terminal and for, if not, switching off again said certain sections and keeping switched off said sections for another Extended DRX period.

15. A computer program product comprising computer-executable instructions for performing the method according to claim 1, when the program is run on a computer.

* * * * *